(12) United States Patent
Shaffer et al.

(10) Patent No.: US 8,259,954 B2
(45) Date of Patent: Sep. 4, 2012

(54) ENHANCING COMPREHENSION OF PHONE CONVERSATION WHILE IN A NOISY ENVIRONMENT

(75) Inventors: Shmuel Shaffer, Palo Alto, CA (US); Mukul Jain, San Jose, CA (US); Labhesh Patel, San Francisco, CA (US); Sanjeev Kumar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1332 days.

(21) Appl. No.: 11/870,808

(22) Filed: Oct. 11, 2007

(65) Prior Publication Data
US 2009/0097677 A1 Apr. 16, 2009

(51) Int. Cl.
*H04R 29/00* (2006.01)
*H03G 3/20* (2006.01)
*H04B 15/00* (2006.01)

(52) U.S. Cl. .......... 381/56; 381/57; 381/94.2; 381/94.3

(58) Field of Classification Search .................. 381/56, 381/57, 94.2, 94.3, 316, 94.1, 94.7
See application file for complete search history.

(56) References Cited

U.S. PATENT DOCUMENTS 5,113,449 A 5/1992 Blanton et al.
6,317,613 B1 * 11/2001 Brown, Jr. .............. 455/570
6,724,862 B1 4/2004 Shaffer et al.

OTHER PUBLICATIONS

"Voice Alteration, Electronic", Espionage Information: UI-Vo , Aquired at: http://www.espionageinfo.com/UI-Vo/Voice-Alteration-Electronic.html, 3 pages, 2007.
"SAM—Small Array Microphone", Fortemedia Technology, Aquired at: http://www.fortemedia.com/SAM/sam_web.htm, 2 pages, 2007.
"The Bose QuietComfort™ 2 Acoustic Noise Cancelling® Headset", The Travel Insider, Aquired at: http://www.thetravelinsider.info/2003/0912.htm, 4 pages, 2007.
"Phone Voice Changer", Personal Arms.com, Aquired at: http://www.personalarms.com/telephone_voice_changer_2.htm, 2 pages, 2007.
"AV Voice Changer Software 6.0.10", Aquired at: http://www.soft14.com/cgi-bin/sw-link.pl?act=sp8034, 3 pages, 2007.
"Development and Evaluation of the Listening in Spatialized Noise Test", Ear and Hearing: The official Journal of the American Auditory Society AAS, Aquired at: http://www.ear-hearing.com/pt/re/earhearing/abstract.00003446-200602000-00003.htm; jsessionid=HKQdSnmBxVQ1XJXFGvD8pvgsBDmPqS0qnV7LHkkpJxLvJ5jKynrb!-656639706!181195629!8091!-1, 2 pages, Feb. 2006.

* cited by examiner

*Primary Examiner* — Vivian Chin
*Assistant Examiner* — Douglas Suthers
(74) *Attorney, Agent, or Firm* — Fish & Richardson P.C.

(57) ABSTRACT

In one embodiment, one or more users may be participating in a conversation. In one example, a first user may be speaking into a speaker end device and a second user may be listening at a listener end device. The second user may be in an environment where noise may be present. Particular embodiments determine characteristics of the noise at the listener end device. Characteristics of a voice signature for a user speaking with the speaker end device are also determined. Comprehension enhancement of voice signals received from speaker end device is then performed based on characteristics of the noise at the listener end device and characteristics of the voice signature. For example, the signature of the voice signals may be altered to lessen the overlap with the noise.

21 Claims, 3 Drawing Sheets

ENHANCING COMPREHENSION OF PHONE CONVERSATION WHILE IN A NOISY ENVIRONMENT

TECHNICAL FIELD

Particular embodiments generally relate to telecommunications.

BACKGROUND

With the proliferation of mobile phones, users place and receive calls from a variety of places where there may be loud ambient noise. For example, a user may participate in a call from an airport or a bus that takes him/her from a parking lot to an airport, a mall, or any other noisy environment. In these cases, the voice of the speaker may be generated in a noise-free environment, but the listener may have a hard time comprehending the conversation because of the noise around him/her.

DESCRIPTION OF EXAMPLE EMBODIMENTS

Overview

In one embodiment, one or more users may be participating in a conversation. In one example, a first user may be speaking into a speaker end device and a second user may be listening at a listener end device. The second user may be in an environment where noise may be present. Particular embodiments determine characteristics of the noise at the listener end device. Characteristics of a voice signature for a user speaking with the speaker end device are also determined. Comprehension enhancement of voice signals received from speaker end device is then performed based on characteristics of the noise at the listener end device and characteristics of the voice signature. For example, the signature of the voice signals may be altered to lessen the overlap with the noise.

Example Embodiments

Figure 1:
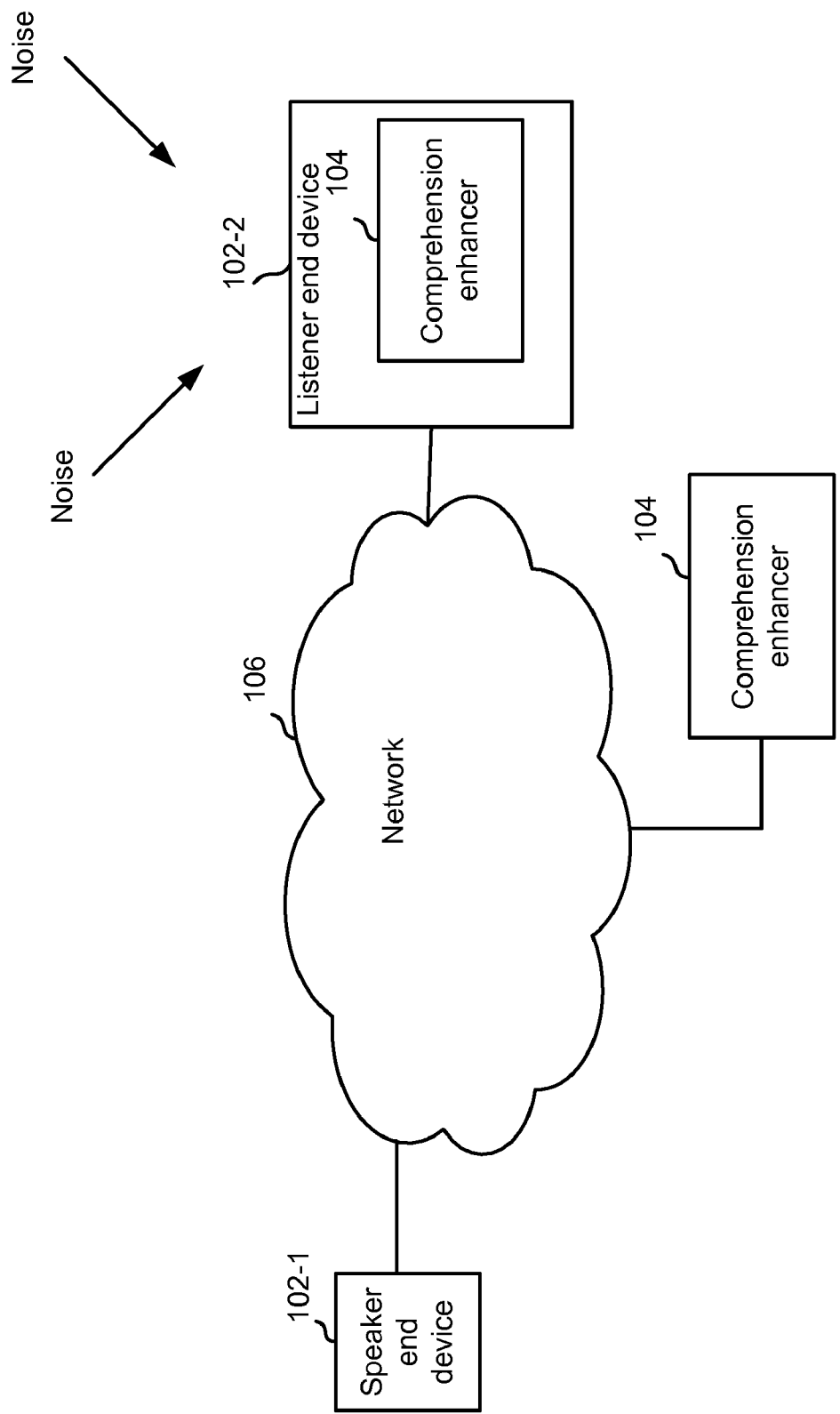
FIG. 1 depicts an example of a system for enhancing comprehension of voice in a noisy environment.

FIG. 1 depicts an example of a system for enhancing comprehension of voice in a noisy environment. As shown, end devices 102, a comprehension enhancer 104, and a network 106 are provided. It will be understood that other components, such as routers, other network devices, etc. of the system are not shown but will be appreciated by a person skilled in the art.

End devices 102 may be any suitable devices that allow a voice conversation. The conversation may be between multiple users (e.g., two or more users talking amongst themselves), a user interacting with a machine (interactive voice response (IVR), etc. In one example, end devices 102 include cellular phones, PSTN phones, Internet Protocol (IP) phones, soft phones, instant message clients, personal computers, smart phones, servers, etc.

Network 106 may be any network that can facilitate a conversation between end devices 102. For example, network 106 includes an Internet Protocol network, public switched telephone network (PSTN), local area network (LAN), wide area network (WAN), etc.

In one example, end device 102-1 may be considered a speaker end device and end device 102-2 is a listener end device. In one embodiment, a "speaker" may be any entity that can generate voice signals. For example, in one embodiment, a user for speaker end device 102-1 is speaking and voice signals from speaker end device 102-1 are sent to end device 102-2. In another embodiment, a machine originated voice may be provided, such as from an IVR end device 102-1 (e.g., IVR server). A user of listener end device 102-2 is listening to the voice. Although a speaker and listener are described, it will be understood that in a conversation, both end devices may be considered speaker end devices and listener end devices. Thus, as described, the functions of end device 102-2 may be found in end device 102-1, and vice versa.

In the environment that end device 102-2 is found, noise may be experienced. The noise may be ambient noise that is associated with the environment in which end device 102-2 is located. Ambient noise may be noise that is produced by entities near end device 102-2. For example, different entities may have audible sounds in a location that constitute noise to a listener. The noise may be produced by voices of other people, machinery operating, sounds produced by moving objects, electric interference (AC driven machinery), etc. Also, the noise may be produced by end device 102-2, such as components operating in end device 102-2 may generate noise. In one example, with multifunction phones, circuitry for a camera may produce noise that interferes with the received voice. Accordingly, while a listener is trying to understand what a speaker is saying in the conversation, the noise may interfere with the voice signals. For example, the voice signals may be around a similar frequency as the noise. Thus, it may be hard for a user to understand the voice because the noise interferes with the voice signals.

Accordingly, comprehension enhancer 104 is configured to allow for better comprehension of voice signals in a noisy environment. In one embodiment, a voice signature for the first user that is speaking is determined. The voice signature may be a unique set of parameters associated with the voice of a given speaker which includes among other characteristics, the frequency characteristics of the speaker's voice. For example, the voice signature may be a frequency spectrum of the speaker's voice.

Comprehension enhancer 104 analyzes the noise received to determine a frequency spectrum for the noise. The frequency spectrum of the speaker and the frequency spectrum of the noise are then analyzed to determine if comprehension of received voice signals can be enhanced. For example, if it is determined that the voice signature and noise frequency spectrum overlap, the comprehension enhancer may alter the voice signature of the voice signals to reduce this overlap. In one example, if the noise and voice signature are both found in the low frequency spectrum range, then the frequency of received voice signals from the speaker may be altered to be in a higher frequency spectrum. This may lessen the interference of the noise with the voice signals, which may allow the listener to be able to better comprehend the voice of the speaker.

Figure 2:
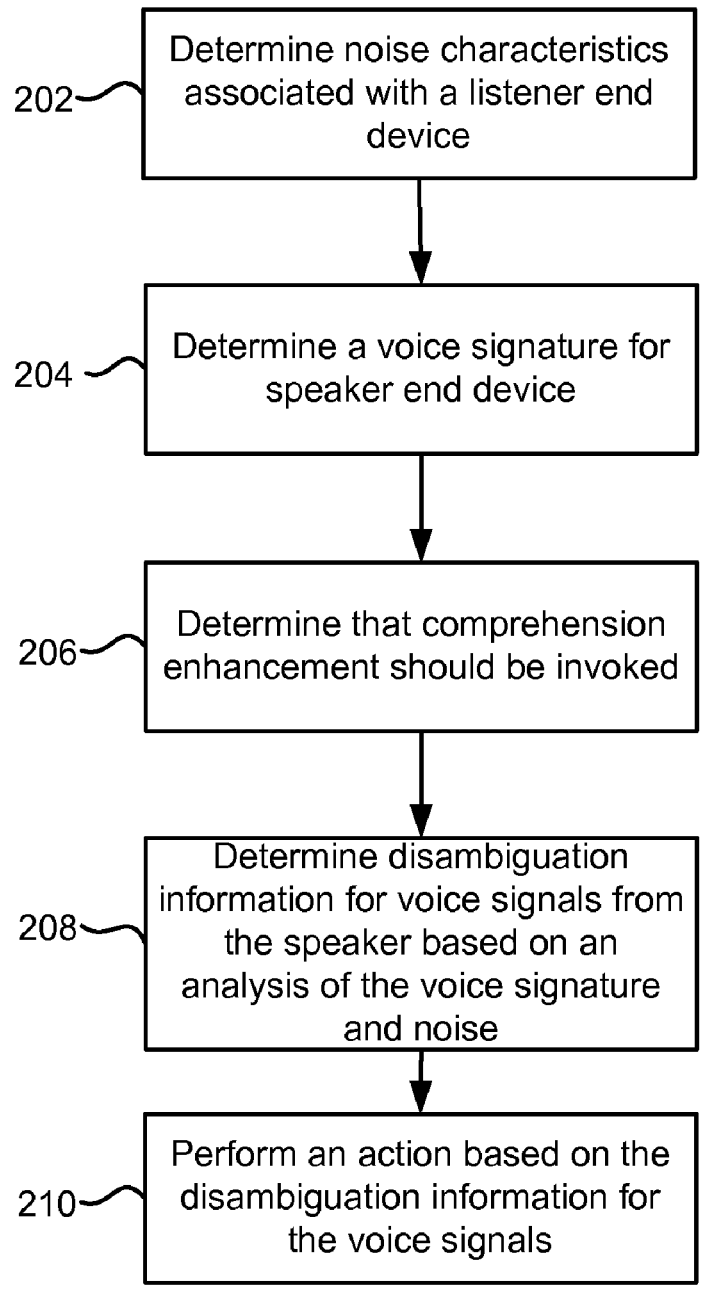
FIG. 2 depicts an example of a method for enhancing comprehension in a communication.

FIG. 2 depicts an example of a method for enhancing comprehension in a communication. Step 202 determines noise characteristics associated with a listener end device 102-2. For example, a microphone for listener end device 102-2 may measure the noise in an environment in which listener end device 102-2 is located. The frequency spectrum of the noise may then be determined. In another embodiment, other devices may measure the noise in the environment in which listener end device 102-2 is located. For example, other microphones situated in an office may be used. Also, if a user is in a known location, such as in a lunchroom in an office building, a conference room, etc., then a pre-determined frequency spectrum for the noise of the location may be retrieved from storage. Thus, it may be assumed that noise is present in the environment. For example, end device 102-2 may be pre-configured with settings that indicate different frequency characteristics of noise, such as airport noise, office noise, conference noise, mall noise, street noise, etc. A user may choose between the noise settings that best represents the location and that frequency spectrum is used.

Step 204 determines characteristics of a voice signature for speaker end device 102-1. The voice signature may be measured from voice signals that are received from speaker end device 102-1 in the conversation. Also, the voice signature may have been predetermined. For example, a voice signature may have already been determined for that speaker and stored. Thus, the voice signature may be retrieved from storage. The determination of the voice signature may be determined in listener end device 102-2, the network, in speaker end device 102-1, or in any other location.

Step 206 determines that comprehension enhancement should be invoked. For example, the listener may determine that it is hard to decipher between the voice of the speaker and the noise and thus requests that comprehension enhancement should be performed. Also, it may be automatically determined that comprehension enhancement may be useful to the user and a message may be sent to the listener suggesting that the listener invoke comprehension enhancement. Also, comprehension enhancement may be automatically invoked.

Step 208 determines disambiguation information for voice signals from the speaker based on an analysis of the voice signature and noise. For example, the frequency spectrum of the ambient noise is compared with the frequency spectrum of the voice signature for the speaker. The disambiguation information may be a suitable frequency spectrum where the ambient noise is not as pronounced when the voice signals are heard. For example, if the frequency of the noise and the voice signature are found in a low frequency range, then the disambiguation information may indicate the voice should be moved to a higher frequency spectrum. In one example, the frequency of the noise and the voice signature may overlap. The disambiguation information may lessen the overlap by altering the voice signals.

It should be noted that there many different kinds of noise that are present. Each noise may have a different frequency spectrum. The different frequency spectrums of the different noise may all be taken into account when enhancing comprehension. Thus, the voice signature of the speaker may be altered to a frequency spectrum that is considered to provide the optimal comprehension taking into account the different frequency spectrums of the noise.

Step 210 then performs an action based on the disambiguation information. For example, the voice signals may be altered in frequency such that they do not overlap with the frequency of the noise as much. For example, the disambiguation information may indicate that incoming voice signals should be altered to lesson overlap with the noise frequency spectrum. The alteration of voice signals may alter the pitch by detecting the frequency pattern of the speaker. A non-linear or linear filter (or one or more mathematical equations or algorithms) is applied to the frequency pattern, and the signals may be selectively eliminated or shifted up and down to produce a different frequency. Accordingly, when the user hears the voice of the speaker, the frequency of the voice signals is altered and presumably the user may be able to better comprehend the voice of the speaker. One reason why a user may be able to better comprehend the voice of the speaker is because humans may be able to better understand signals of different frequencies that are received at the same time. For example, when two males or two women speak at the same time, it is harder to hear the two males speaking at the same time or the two females speaking at the same time than if a male and female were speaking at the same time. This may be because the female may speak at a high frequency (i.e., a higher pitched voice) and the male may speak at a lower frequency (i.e., a lower pitched voice). In this case, a user may be able to make out the female and/or male voice when they are spoken together. This may be known as the cocktail-party syndrome in that when many people are talking, humans may be able to focus their attention on a certain frequency of voice while filtering out other frequencies of voice. Thus, a user may be able to focus on the voice of the speaker while filtering out the noise if they are in different frequency ranges.

Figure 3:
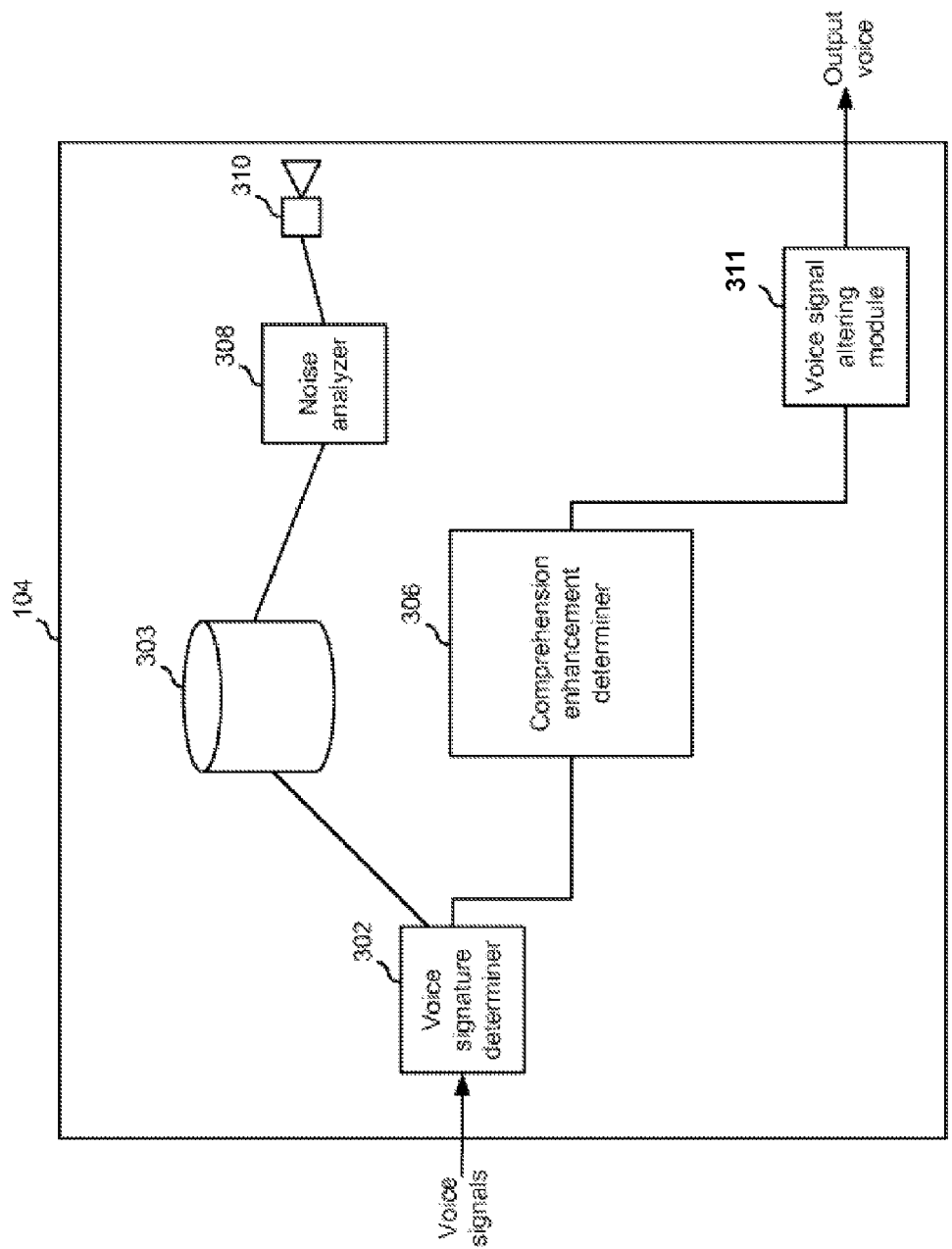
FIG. 3 depicts an example of a comprehension enhancer.

FIG. 3 depicts an example of comprehension enhancer 104. It should be noted that comprehension enhancer 104 may be located in listener end device 102-2, or in another location, such as being attached to network 106, other computing devices, speaker end device 102-1, etc.

A voice signature determiner 302 determines a voice signature for a user. For example, voice signature determiner 302 may analyze voice signals that are received from speaker end device 102-1 and determine a voice signature. Also, a voice signature may be retrieved from storage 303. For example, a speaker may be identified and then a voice signature for the user is retrieved from storage 303. A phone number, username, etc. may be used to retrieve the voice signature from storage 303.

A noise analyzer 308 determines a frequency spectrum for noise in a location. For example, a microphone 310 may be used to measure noise. In one embodiment, microphone 310 may be a microphone of listener end device 102-2, or may be located in other areas. Noise analyzer 308 determines the frequency spectrum from the received signals for the ambient noise. In another embodiment, noise analyzer 308 may determine the frequency spectrum from storage 303. For example, if the location of the listener is known, such as through global position satellite (GPS) information, input from the user, or any other information, a predetermined noise frequency spectrum may be retrieved from storage 303. Also, a pre-set noise setting may be used.

A comprehension enhancement determiner 306 then determines when comprehension enhancement should be invoked. In one embodiment, input from a user may be received indicating that comprehension enhancement is desired. For example, a user may use an input on end device 102-2 to indicate that comprehension enhancement is desired. Also, comprehension enhancement determiner 306 may automatically detect a condition that indicates comprehension enhancement may be desired by a user. For example, comprehension enhancement determiner 306 may detect that the listener has turned the volume of the earphone all the way up and that the power of the noise is high. Upon detection of this condition, comprehension enhancement determiner 306 may determine that comprehension enhancement may be helpful. Accordingly, comprehension enhancement determiner 306 may send an alert to the user indicating that enhancement may be helpful. An alert may be a flashing light, a message on a liquid crystal display (LCD) screen of end device 102-2, a whisper message in the ear of the user, or any other alert. The user may then indicate whether or not the comprehension enhancement is desired or not.

In yet another embodiment, comprehension enhancement determiner 306 may analyze the frequency spectrum of the noise and the voice signature to determine if comprehension enhancement may be helpful. For example, if the frequencies of the noise and the voice signature overlap in the frequency spectrum, then it may be determined that comprehension enhancement may be helpful. In this case, comprehension enhancement determiner 306 may alert the user that comprehension enhancement may be helpful and the user may be given the choice to invoke it.

In another embodiment, comprehension enhancement determiner 306 may automatically determine that comprehension enhancement is desired and automatically invokes it. The user may be notified that the comprehension enhancement is being performed so he/she is not surprised by the change in voice.

Once it is determined that comprehension enhancement is desired, a voice signal altering module 311 is configured to perform the comprehension enhancement. For example, the frequency of the voice signals received may be altered to another frequency spectrum. If both the noise and the voice signals are in the low frequency spectrum, then the voice signals may be altered such that they are in a higher frequency spectrum. In one embodiment, voice signal altering module 311 attempts to alter the voice signals as little as possible. This is so that the voice of the user is not changed so it is very unrecognizable by the listener. The determination as to how much the voice signals should be altered may be determined based on the analysis of the frequency spectrum of the noise and the voice signature for the speaker.

Voice signal altering module 311 then outputs the altered voice signals received from the speaker. For example, the voice signals may be outputted in a speaker for end device 102-2.

The comprehension enhancement may be performed in real time as the ambient noise varies. For example, if the user moves from a hallway to a room that is loud, then the comprehension enhancement analysis may be performed automatically and the user may be notified that the frequency of the voice may be altered to increase comprehension. Also, if interference of the ambient noise and the voice signature dissipates, then the altering of the voice signals may be ended.

Also, although particular embodiments are described with respect to a one to one conversation, they may be used in a conference with many users. The voice signatures of many speakers may be taken into account to perform the comprehension enhancement. For example, as speakers change, the new voice signature of the speaker is taken into account in performing the comprehension enhancement.

Accordingly, conversations for a user in noisy environments may be enhanced. The enhancement may be invoked automatically or when a user requests it. By altering the frequency of a speaker's voice, the speaker may be better understood by a listener because noise may not interfere with the speaker's voice as much.

Although the description has been described with respect to particular embodiments thereof, these particular embodiments are merely illustrative, and not restrictive. Although a telephone conversation is described, particular embodiments may be used in other communications, such as phone conferences, video conferences, television/movie playback, presentations, etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   determining characteristics of noise for a listener end device engaged in a conversation with a speaker end device;
   determining characteristics of a voice signature associated with the speaker end device;
   analyzing the characteristics of the noise and the characteristics of the voice signature; and
   performing an action to enhance comprehension of voice signals received from the speaker end device based on the analysis of the characteristics of the noise and the characteristics of the voice signature associated with the speaker end device,
   wherein analyzing the characteristics of the noise and the characteristics of the voice signature comprises determining disambiguation information based on an overlap of a frequency spectrum of the noise and the voice signature, and
   wherein the action performed includes altering the frequency spectrum of the received voice signals based on the disambiguation information.

2. The method of claim 1, wherein performing the action comprises altering the voice signature of the voice signals to lessen overlap with the noise.

3. The method of claim 1, wherein the noise comprises ambient noise in an environment where the listener end device is located.

4. The method of claim 1, wherein determining characteristics of the noise comprises detecting the noise using a noise detector in the listener end device.

5. The method of claim 1, wherein determining characteristics of the voice signature or the noise comprises dynamically determining the characteristics of the noise or voice signature.

6. The method of claim 1, wherein determining the characteristics of the noise comprises determining a frequency spectrum of the noise and wherein determining the characteristics of the voice signature comprises determining a frequency spectrum of the voice signature.

7. The method of claim 1, further comprising receiving an input from a user indicating the action to enhance comprehension is desired.

8. The method of claim 1, further comprising automatically determining that the action to enhance comprehension should be performed.

9. The method of claim 1, further comprising notifying the user that alteration of the voice signature should be performed based on the analysis.

10. The method of claim 1, wherein the received voice signals comprise voice signals generated from a user speaking or a machine speaking.

11. An apparatus comprising:
    one or more processors; and
    logic encoded in one or more tangible media for execution by the one or more processors and, when executed, operable to:
       determine characteristics of noise for a listener end device engaged in a conversation with a speaker end device;
       determine characteristics of a voice signature associated with the speaker end device;
       analyze the characteristics of the noise and the characteristics of the voice signature; and
       perform an action to enhance comprehension of voice signals received from the speaker end device based on the analysis of the characteristics of the noise and the characteristics of the voice signature associated with the speaker end device,
    wherein the logic operable to analyze the characteristics of the noise and the characteristics of the voice signature comprises logic operable to determine disambiguation information based on an overlap of a frequency spectrum of the noise and the voice signature, and
    wherein the action performed includes altering the frequency spectrum of the received voice signals based on the disambiguation information.

12. The apparatus of claim 11, wherein the logic operable to perform the action comprises logic that is operable to alter the voice signature of the voice signals to lessen overlap with the noise.

13. The apparatus of claim 11, wherein the noise comprises ambient noise in an environment where the listener end device is located.

14. The apparatus of claim 11, wherein the logic operable to determine characteristics of the noise comprises logic that is operable to detect the noise using a noise detector in the listener end device.

15. The apparatus of claim 11, wherein the logic operable to determine characteristics of the voice signature or the noise comprises logic that is operable to dynamically determine the characteristics of the noise or voice signature.

16. The apparatus of claim 11, wherein the logic operable to determine the characteristics of the noise comprises logic that is operable to determine a frequency spectrum of the noise and wherein the logic operable to determine the characteristics of the voice signature comprises logic that is operable to determine a frequency spectrum of the voice signature.

17. The apparatus of claim 11, wherein the logic is further operable to receive an input from a user indicating the action to enhance comprehension is desired.

18. The apparatus of claim 11, wherein the logic is further operable to automatically determine that the action to enhance comprehension should be performed.

19. The apparatus of claim 11, wherein the logic is further operable to notify the user that alteration of the voice signature should be performed based on the analysis.

20. The apparatus of claim 11, wherein the received voice signals comprise voice signals generated from a user speaking or a machine speaking.

21. A nonvolatile computer storage medium encoded with a computer program, the program comprising instructions that when executed by one or more computers cause the one or more computers to perform operations comprising:
    determining characteristics of noise for a listener end device engaged in a conversation with a speaker end device;
    determining characteristics of a voice signature associated with the speaker end device;
    analyzing the characteristics of the noise and the characteristics of the voice signature; and
    performing an action to enhance comprehension of voice signals received from the speaker end device based on the analysis of the characteristics of the noise and the characteristics of the voice signature associated with the speaker end device,
    wherein analyzing the characteristics of the noise and the characteristics of the voice signature comprises determining disambiguation information based on an overlap of a frequency spectrum of the noise and the voice signature, and
    wherein the action performed includes altering the frequency spectrum of the received voice signals based on the disambiguation information.

* * * * *